(12) United States Patent
Lee et al.

(10) Patent No.: US 10,938,970 B1
(45) Date of Patent: Mar. 2, 2021

(54) MOBILE TERMINAL

(71) Applicant: LG ELECTRONICS INC., Seoul (KR)

(72) Inventors: Jaewook Lee, Seoul (KR); Insu Song, Seoul (KR); Timothy Kang, Seoul (KR); Minsoo Kim, Seoul (KR); Sunglyong Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/843,828

(22) Filed: Apr. 8, 2020

Related U.S. Application Data

(63) Continuation of application No. PCT/KR2019/017100, filed on Dec. 5, 2019.

(51) Int. Cl.
*H04B 1/38* (2015.01)
*H04M 1/02* (2006.01)
(Continued)

(52) U.S. Cl.
CPC ....... *H04M 1/0268* (2013.01); *H04M 1/0237* (2013.01)

(58) Field of Classification Search
CPC .... H04M 1/0268; H04M 1/0237; H04M 1/02; G06F 1/1681; G06F 1/1643;
(Continued)

(56) References Cited

U.S. PATENT DOCUMENTS 8,805,439 B2 * 8/2014 Kim .................. H04M 1/72577
455/556.1
10,185,363 B2 * 1/2019 Hiroki .................. G06F 1/1652
(Continued)

FOREIGN PATENT DOCUMENTS

CN 108664087 10/2018
EP 3258675 12/2017
(Continued)

OTHER PUBLICATIONS

PCT International Application No. PCT/KR2019/017100, International Search Report dated Oct. 20, 2020, 8 pages.
(Continued)

*Primary Examiner* — Pablo N Tran
(74) *Attorney, Agent, or Firm* — Lee, Hong, Degerman, Kang & Waimey

(57) ABSTRACT

A mobile terminal includes a first frame having a first side-face, a second frame moveable in a first direction or a second direction opposite to the first direction from the first frame, and having a second side-face facing the first side-face, and a slide bar positioned between the first side-face and the second side-face, and extending in the first direction, wherein the second frame moves in the first direction to convert a state of the mobile terminal from a first state in which the first frame and the second frame are overlapped with each other to a second state, and wherein the second frame moves in the second direction to convert the state from the second state to the first state. The mobile terminal reduces friction between the first and second frames through a simple slide structure, so that the state conversion between the first and second states is easy.

13 Claims, 14 Drawing Sheets

(51) Int. Cl.
*G09F 9/30* (2006.01)
*G06F 1/16* (2006.01)

(58) Field of Classification Search
CPC .... G06F 1/1656; G06F 1/1641; G06F 1/1652; G09F 9/301; G09F 9/30; H05K 5/02; G02F 1/1333; H04B 1/38
See application file for complete search history.

(56) References Cited

U.S. PATENT DOCUMENTS

| | | | |
|---|---|---|---|
| 10,359,810 B2* | 7/2019 | Miyake | H01L 51/0097 |
| 10,481,638 B2* | 11/2019 | Yoshizumi | G06F 1/1626 |
| 10,613,586 B2* | 4/2020 | Yamazaki | G06F 1/1698 |
| 2014/0211399 A1 | 7/2014 | O'Brien | |
| 2016/0216737 A1 | 7/2016 | Hayk et al. | |
| 2017/0290530 A1* | 10/2017 | Hong | A61B 5/1116 |
| 2018/0102072 A1 | 4/2018 | Lee et al. | |
| 2019/0268455 A1 | 8/2019 | Baek et al. | |
| 2020/0089273 A1* | 3/2020 | Watamura | G06F 1/1626 |
| 2020/0249722 A1* | 8/2020 | Cha | H04M 1/0268 |

FOREIGN PATENT DOCUMENTS

| | | |
|---|---|---|
| KR | 101784880 | 10/2017 |
| KR | 1020190001389 | 1/2019 |
| KR | 1020190004618 | 1/2019 |

OTHER PUBLICATIONS

European Patent Office Application Serial No. 20171360.9, Search Report dated Oct. 15, 2020, 14 pages.

* cited by examiner (a)

(b)

(a)

(b)

(a)

(b)

(a)

(b)

(a)

(b)

(a)

(b)

(a)

(b)

(a)

(b)

(a)

(b)

MOBILE TERMINAL

CROSS-REFERENCE TO RELATED APPLICATIONS

This application is a continuation of International Application No. PCT/KR2019/017100, filed on Dec. 5, 2019, the contents of which are hereby incorporated by reference herein in its entirety.

BACKGROUND

Field

The present disclosure relates to a mobile terminal, and to a mobile terminal having a flexible display.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device having a function of receiving, processing, and displaying a video that a user may watch. For example, the display device receives a broadcast selected by the user from broadcast signals transmitted from a broadcasting station, separates a video signal from the received signals, and displays the separated video signal on a display.

In recent years, because of a development of a broadcasting technology and a network technology, functions of the display device have also been considerably diversified, and a performance of the device has been improved accordingly. That is, the display device has been developed to provide not only broadcast contents but also various other contents to the user. For example, the display device may provide game play, music listening, internet shopping, user customized information, and the like using various applications as well as programs received from the broadcasting station. In order to perform such extended functions, the display device may be basically connected to other devices or networks using various communication protocols, and may provide the user with an ubiquitous computing environment. In other words, the display device has evolved into a smart device that enables connectivity to a network and continuous computing.

Recently, a flexible display, which has sufficient elasticity, and thus, be able to be deformed largely, has been developed. A size of the mobile terminal may be varied using a deforming property of the flexible display. In the mobile terminal having such a variable structure, a change in the structure of the mobile terminal must be performed stably. Further, a support structure and the like of the variable display unit may be a problem.

SUMMARY

A purpose of the present disclosure is to provide a mobile terminal having a tensioning structure that may move in association with movement of a display and a frame when the mobile terminal slides, and may maintain a flat state.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

One aspect of the present disclosure proposes a mobile terminal including a first frame, a second frame moving in a first direction from the first frame to convert a state of the mobile terminal from a first state to a second state, and sliding in a second direction opposite to the first direction in the second state to convert the state of the mobile terminal to the first state, a slide frame movable in the first direction or in the second direction with respect to the second frame, a flexible display unit including a first region coupled to the first frame, a second region coupled to the slide frame, and a third region positioned between the first region and the second region and bent while surrounding the second frame, a tensioning belt having one side fixed to the first frame and the other side coupled to the slide frame, and a belt roller positioned at a second directional side of the second frame, and wound with the tensioning belt.

In one implementation, one side of the tensioning belt may be disposed adjacent to a first directional end of the first frame, and the belt roller may be disposed at a second directional end of the second frame.

In one implementation, the first frame may include a first front portion coupled with the first region and a first rear portion spaced rearward from the first front portion, the second frame may include a second rear portion located on a rear face of the first rear portion in the first state, and the belt roller may have a diameter corresponding to a thickness of the second rear portion.

In one implementation, the mobile terminal may further include a pair of tensioning pins arranged at the first directional end of the first frame and arranged in a vertical direction, and wherein the tensioning belt may be wound around the pair of tensioning pins in an S-shape, wherein one end of the tensioning belt may be coupled to a first front portion of the first frame.

In one implementation, the tensioning belt may be in contact with one side of the tensioning pin, and the mobile terminal may further include an elastic body for pressing the other side of the tensioning pin.

In one implementation, the mobile terminal may further include a tensioning seat positioned on rear faces of the second region and the third region of the flexible display unit, wherein both ends of the tensioning seat are coupled to one end of the tensioning belt.

In one implementation, the mobile terminal may further include a link rail coupled to one of the first frame and the second frame, and extending in a third direction perpendicular to the first direction, and a support link having one end moving along the link rail and the other end coupled to the other of the first frame or the second frame.

In one implementation, the support link may be disposed in the third direction perpendicular to the first direction in the first state, and the support link may support the third region of the display unit while traversing an extended portion of the second frame in the second state.

In one implementation, the support link may include a first coupling hinge pivotably coupled to one end of the support link, and fastened to the link rail, and a second coupling hinge pivotably coupled to the other end of the support link, and fixed to one of the first frame and the second frame.

In one implementation, the link rail may include a first rail having a width of a first size and a second rail having a width of a second size greater than the first size, and the first coupling hinge may include a slide protrusion having a thickness corresponding to the width of the first rail, and an extended end positioned at an end of the slide protrusion and having a diameter corresponding to the width of the second rail.

In one implementation, the link rail may include the second rail disposed at a center, and a plurality of first rails arranged symmetrically, and a pair of support links may be symmetrically arranged in the third direction, and wherein first coupling hinges of the pair of support links may move in opposite directions on the pair of first rails.

In one implementation, the second rail may have a shape corresponding to the extended end, and the extended end partially may overlap or may not overlap the second rail in the first state.

In one implementation, the first frame may include a first front portion coupled with the first region, and a first rear portion spaced rearward from the first front portion, and the second frame may further include a second rear portion located on a rear face of the first rear portion in the first state, and a display support positioned on a rear face of the first front portion in the first state, and positioned on a rear face of the third region of the display unit in the second state.

The features of the above-described implantations may be combined with other embodiments as long as they are not contradictory or exclusive to each other.

Effects of the present disclosure are as follows but are limited thereto.

According to the present disclosure, the display unit may be prevented from being separated when the state of the mobile terminal is converted or in the converted state of the mobile terminal, thereby improving usability.

According to the present disclosure, even when the tensioning structure is added, because a driving resistance is small, a flatness of the display unit may be increased without causing a decrease in driving force of the mobile terminal.

According to the present disclosure, because a uniform tensile force may be applied at all times, so that free stop is available in any state.

According to the present disclosure, because the tensile force is not directly applied to the display unit using the tensioning seat that receives a force of the tensioning belt, a reliability of the display unit may be improved.

Further scope of the applicability of the present disclosure will become apparent from a detailed description below. However, various changes and modifications within the spirit and scope of the present disclosure may be clearly understood by those skilled in the art, so that it is to be understood that the specific embodiments, such as the detailed description and the preferred embodiments of the present disclosure, are given by way of example only.

BRIEF DESCRIPTION OF DRAWINGS

The present invention will become more fully understood from the detailed description given herein below and the accompanying drawings, which are given by illustration only, and thus are not limitative of the present invention, and wherein.

DETAILED DESCRIPTIONS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
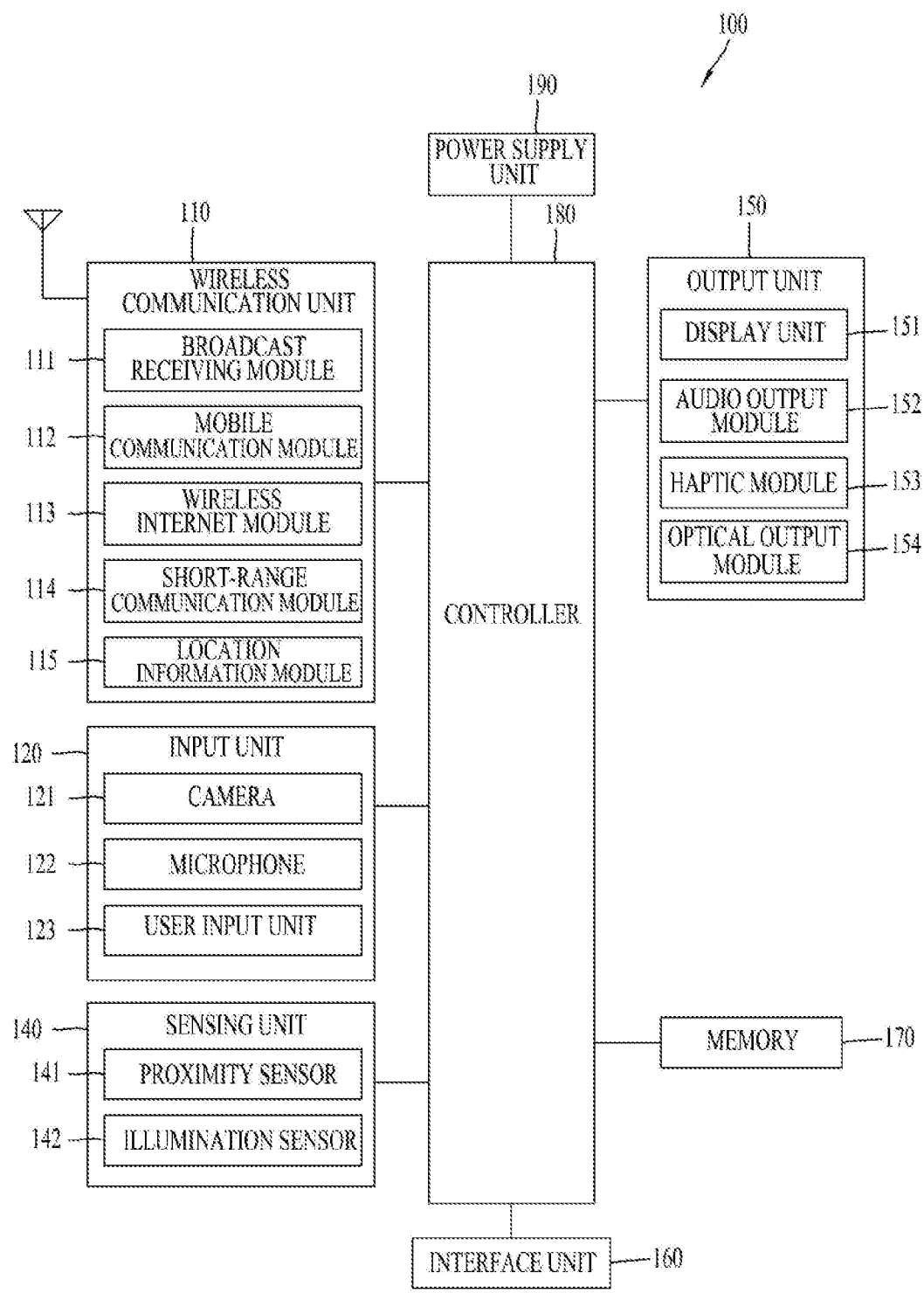
FIG. 1 is a block diagram of a mobile terminal in accordance with the present disclosure.

FIG. 1A is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1A, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
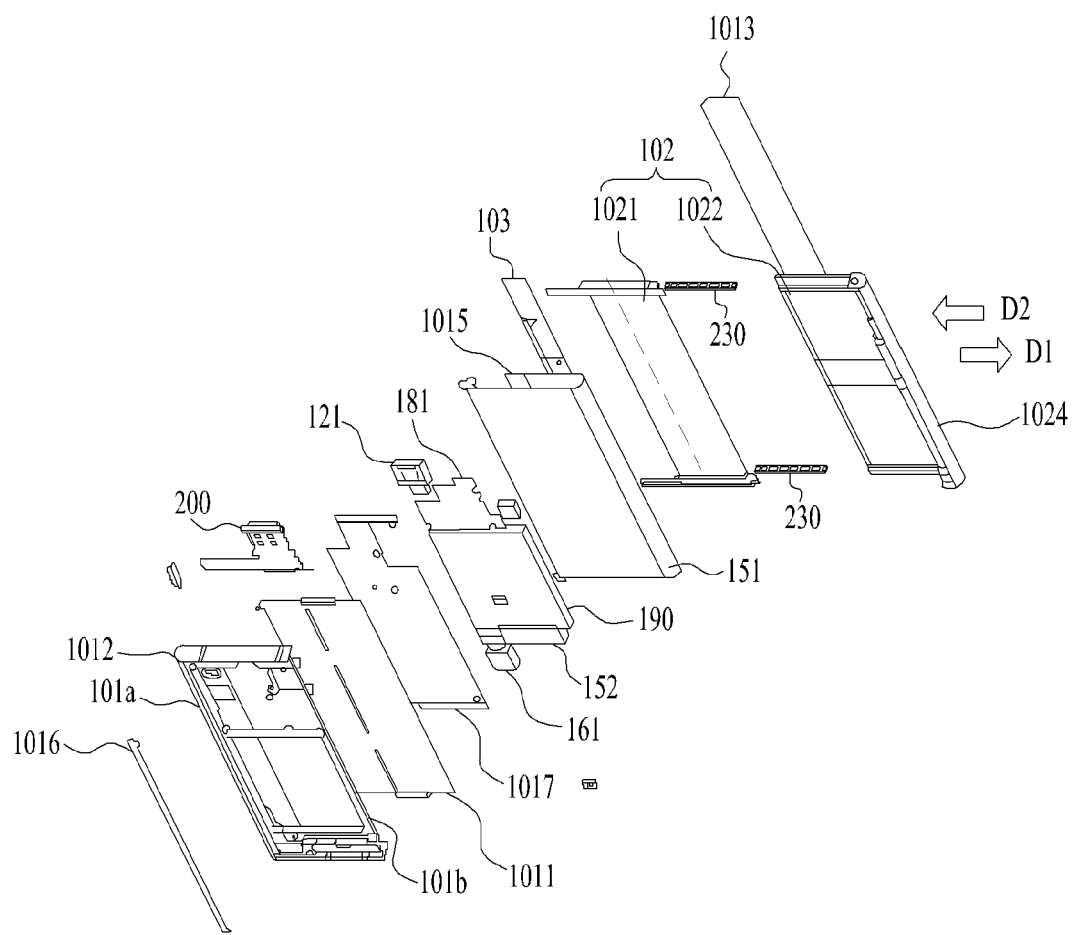
FIG. 2 is an exploded perspective view of a mobile terminal according to one embodiment.
Figure 3:
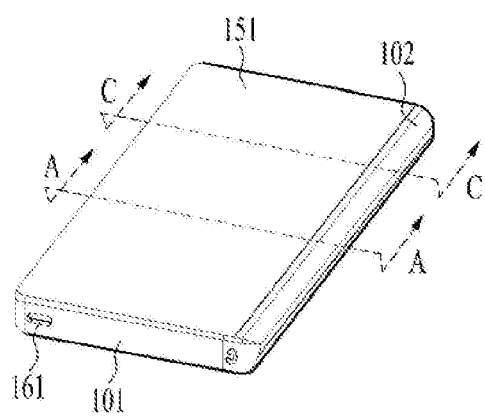
FIG. 3 shows perspective views respectively illustrating a first state and a second state viewed from one side of a mobile terminal according to one embodiment.
Figure 3:
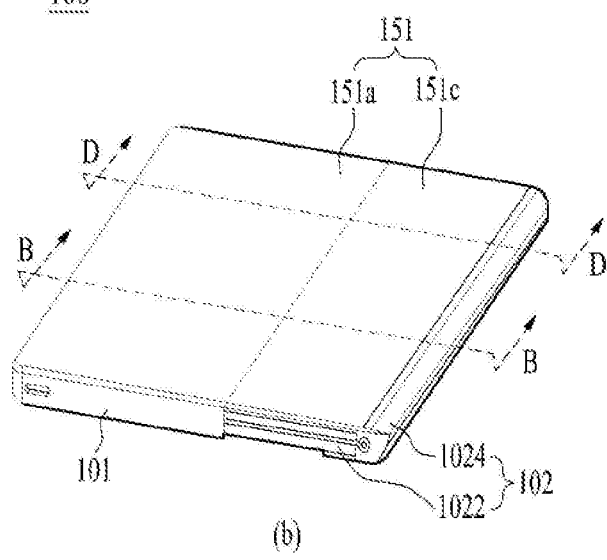
Figure 4:
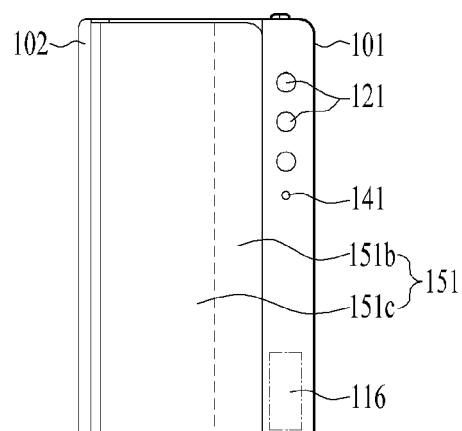
FIG. 4 shows rear face views respectively illustrating a first state and a second state of a mobile terminal according to one embodiment.
Figure 4:
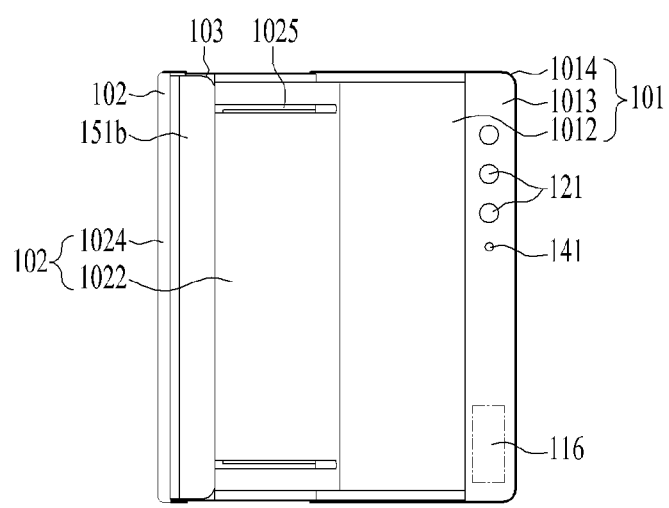
Figure 5:
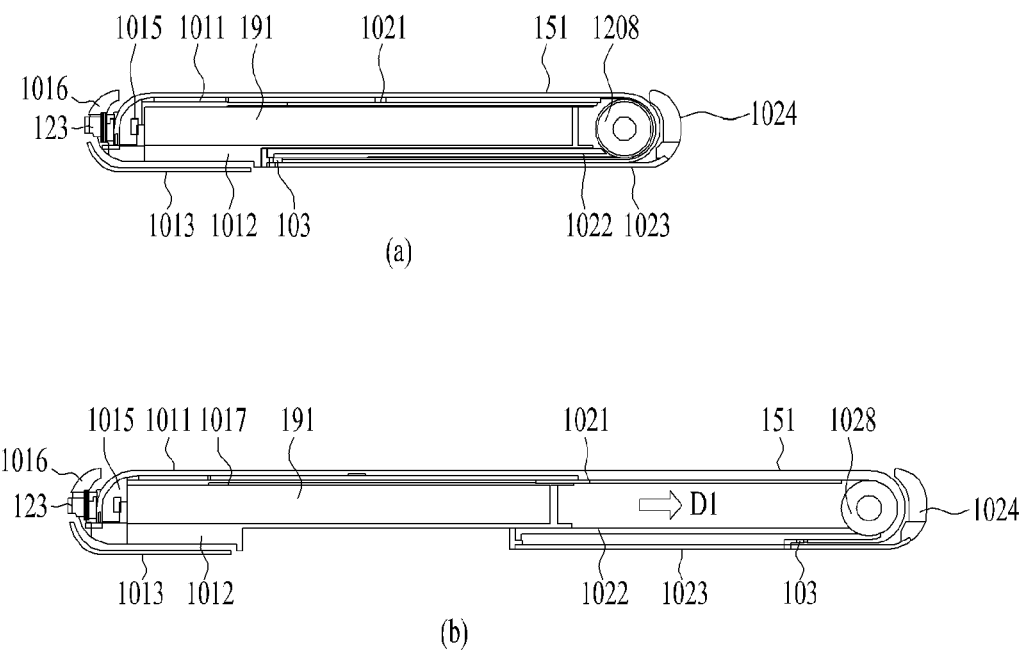
FIG. 5 shows cross-sectional views respectively taken along a line A-A and a line B-B of FIG. 3.

FIG. 2 is an exploded perspective view of a mobile terminal according to one embodiment. Further, FIG. 3 shows perspective views respectively illustrating a first state and a second state viewed from one side of a mobile terminal according to one embodiment. Further, FIG. 4 shows rear face views respectively illustrating a first state and a second state of a mobile terminal according to one embodiment. Further, FIG. 5 shows cross-sectional views respectively taken along a line A-A and a line B-B of FIG. 3. In these drawings, FIGS. 3A, 4A, and 5A show a first state of the mobile terminal, and FIGS. 3B, 4B, and 5B show a second state of the mobile terminal.

As shown, a mobile terminal 100 in a first state is contracted, and has a smaller size than the mobile terminal 100 in a second state. In addition, a size of a display unit 151 located disposed on a front face of the mobile terminal 100 also becomes smaller than that of the display unit 151 in the second state. The mobile terminal 100 of the first state is expanded in a first direction D1 to be in the second state. In the second state, a size of the mobile terminal 100 and a size of the front face of the display unit 151 become larger than that in the first state as shown in FIG. 3B, and a size of the rear face of the display unit 151 is reduced as shown in FIG. 4B. That is, the display unit 151 positioned on the rear face of the mobile terminal 151 in the first state moves to the front face of the mobile terminal 100 in the second state.

In a following description, a direction in which the mobile terminal 100 and the display 151 thereof are extended or enlarged is referred to as a first direction D1, a direction in which the mobile terminal 100 and the display 151 thereof are contracted or retracted, or reduce to be converted into the first state from the second state is referred to as a second direction D2, and a direction perpendicular to the first and second directions D1 and D2 is referred to as a third direction.

As such, the display unit may use a flexible display unit 151 that may be bent such that the position of the display unit may be varied. The flexible display is a lightweight, unbreakable, and durable display that is built on a thin and flexible substrate that may be bent, crooked, folded, twisted, or rolled while retaining properties of a conventional flat panel display.

In addition, an electronic paper is a display technology to which properties of general ink are applied. The electronic paper may be different from the conventional flat panel display in using reflected light. The electronic paper may change information using a twisted ball or electrophoresis using a capsule.

In a state in which the flexible display unit 151 is not deformed (e.g., a state of having an infinite curvature radius, hereinafter referred to as a basic state), a display region of the flexible display unit 151 becomes flat. In a state in which the flexible display unit 151 is deformed by an external force from the basic state (e.g., a state of having a finite radius of curvature, hereinafter referred to as a deformed state), the display region may become a curved face. As shown, information displayed in the deformation state may be visual information output on the curved face. Such visual information is implemented by independently controlling light emission of sub-pixels arranged in a matrix. The sub-pixel refers to a minimum unit for implementing one color.

The flexible display unit 151 may be in a curved state (e.g., a vertically or horizontally curved state) rather than a flat state in the basic state. In this case, when the external force is applied to the flexible display unit 151, the flexible display unit 151 may be deformed into the flat state (or a less curved state) or more curved state.

The flexible display unit 151 may be combined with a touch sensor to implement a flexible touch screen. When a touch is made on the flexible touch screen, the controller 180 (see FIG. 1) may perform control corresponding to such touch input. The flexible touch screen may be configured to detect the touch input in the deformed state as well as in the basic state.

The touch sensor detects the touch (or touch input) applied on the touch screen using at least one of various touch schemes such as a resistive film scheme, a capacitance scheme, an infrared scheme, an ultrasonic wave scheme, a magnetic field scheme, and the like.

As an example, the touch sensor may be configured to convert a change in pressure applied on a specific portion of the touch screen, capacitance generated at the specific portion, or the like into an electrical input signal. The touch sensor may be configured such that a touch object applying a touch on the touch screen may detect touched position and area on the touch sensor, a pressure during the touch, a capacitance during the touch, and the like.

Further, the mobile terminal 100 may have a deformation detection means for detecting the deformation of the flexible display unit 151. Such deformation detection means may be included in the sensing unit 140 (see FIG. 1).

The deformation detection means may be disposed in the flexible display unit 151 or a case (first to second frames 101 to 102 to be described later) to detect information related to the deformation of the flexible display unit 151. In this connection, the information related to the deformation may include a direction in which the flexible display unit 151 is deformed, a degree of the deformation, a deformed position, a deformed time, an acceleration at which the deformed flexible display unit 151 is restored, and the like. In addition, the information related to the deformation may be various information that may be detected due to the bending of the flexible display unit 151.

In addition, the controller 180 may change information displayed on the flexible display unit 151 or generate a control signal for controlling a function of the mobile terminal 100 based on the information related to the deformation of the flexible display unit 151 detected by the deformation detection means.

The state conversion (first or second state) of the flexible display unit 151, i.e., the size change at the front and rear faces of the mobile terminal 100 of the display unit 151 based on the size change of the mobile terminal 100 may be performed manually by a force applied by the user, but may be not limited to such manual scheme. For example, when the mobile terminal 100 or the flexible display unit 151 is in the first state, the mobile terminal 100 or the flexible display unit 151 may be converted into the second state by the user or an application command without the external force applied by the user. As such, in order for the flexible display unit 151 to be automatically deformed without the external force, the mobile terminal 100 may include a driving unit 200 to be described later.

The flexible display unit 151 of the present disclosure is bent 180 degrees while being rolled on a side of the mobile terminal 100 in the first direction. Thus, a portion of the display unit 151 is disposed on the front face of the mobile terminal 100 based on such side, and the other portion thereof is disposed on the rear face of the mobile terminal 100. A portion of the display unit 151 located on the front face of the mobile terminal 100 may be fixed to the front face so as not to move. Further, the other portion thereof located on the rear face of the mobile terminal 100 may be movable to the rear face.

In addition, the display unit 151 may be rolled on or released from the side. Accordingly, the portion disposed on the rear face of the mobile terminal 100 moves, so that the size of the portion disposed on the front face of the mobile terminal 100 may be adjusted. Since the area of the flexible display unit 151 is determined and the flexible display unit 151 is formed of one continuous body, an area of the portion on the rear face decreases as an area of the portion on the front face increases. Such a display unit 151 may be rolled in a second frame 102, which is movable relative to a first frame 101 to be described later, more correctly, on one of sides of the second frame 102. The display unit 151 may be withdrawn or pulled out from or inserted or pushed into the second frame 102 while being rolled in the second frame 102 along a moving direction of the second frame 102 to adjust the area of the display unit 151 on the front face of the mobile terminal 100. Such operation will be described in more detail below along with other relevant components of the mobile terminal 100.

Typically, an antenna is disposed in the case or the housing of the mobile terminal 100, but a portion where the antenna is installed in the case or the housing may be limited because of the flexible display unit 151 that covers not only the front face of the mobile terminal 100 but also the rear face thereof. For this reason, the antenna may be implemented on the flexible display unit 151. An antenna on display (AOD) is an antenna in which a transparent film is formed by stacking an electrode layer and a dielectric layer that have patterns engraved thereon, respectively. The antenna on display may be implemented thinner than an antenna implemented using a laser direct structuring (LDS) technology using a conventional copper nickel plating scheme, so that the antenna on display may not be exposed to the outside without affecting a thickness. In addition, the antenna on display may transmit and receive a signal directly to or from the display unit 151. Accordingly, the antenna on display may be used in the mobile terminal 100 in which the display unit 151 is located on the both faces of the mobile terminal 100 as in the present disclosure.

The mobile terminal 100 of the present disclosure includes frames 101 and 102 in which components are mounted, and the frames 101 and 102 of the present disclosure may vary in size in the first direction as shown in FIG. 2. One or more frames 101 and 102 move relative to each other, and sizes thereof may vary in the first direction. Electronic components are mounted in the frames 101 and 102, and the flexible display unit 151 is located out of the frames 101 and 102.

Since the mobile terminal 100 of the present disclosure includes the flexible display unit 151, the flexible display unit 151 may be combined in a form surrounding front faces and rear faces of the frames 101 and 102. The frame may include the first frame 101 and the second frame 102 moving in the first direction with respect to the first frame 101. The first frame 101 and the second frame 102 include front portions, a rear portions, and side portions, respectively, and are coupled to each other. Thus, the mobile terminal 100 may have a hexahedral outer shape by such coupled first and second frames 101 and 102.

First, the first frame 101 corresponds to a main body of the mobile terminal 100, and may have a space therein for accommodating various components. In addition, the first frame 101 may accommodate the second frame 102 movably coupled to the first frame 101 in such a space. More specifically, as shown in FIGS. 2 and 5, the first frame 101 may include a first front portion 1011 disposed at a front portion of the mobile terminal 100 and supporting the front face of the display unit 151 and a first rear portion 1012 disposed at a rear portion of the mobile terminal and on which various components are mounted.

The first front portion 1011 and the first rear portion 1012 may be spaced apart from each other at a predetermined spacing to define a predetermined space therebetween, and may be connected to each other by a side portion 1014. The side portion 1014 may be integrally formed with the first rear portion 1012 or the first front portion 1011. The camera 121, the audio output module 152, and the input/output terminal 161, the controller 180, and the power supply unit 190 may be accommodated as components of the mobile terminal 100 in the space in the first frame 101. For example, the controller 180 may be a circuit board 181 including a processor and an electronic circuit for controlling the operation of the mobile terminal, and the power supply unit 190 may be a battery 191 and related components. In addition, the driving unit 200 that controls the slide movement of the second frame 102, which will be described later, may also be accommodated in the first frame 101.

As described above, the display unit 151 has the continuous body, and thus, may be disposed on both the front face and the rear face of the mobile terminal 100 while being rolled in the mobile terminal 100. The display unit 151 may include the front face positioned at the front face of the mobile terminal 100, the rear face positioned at the rear face of the mobile terminal 100, and the side face positioned between the front face and the rear face thereof and surrounding the side face of the mobile terminal. The front face and the rear face of the display unit 151 are flat, and the side face of the display unit 151 may form a curved face. When the flexible display unit 151 may be damaged when being bent. Thus, the flexible display unit 151 may be formed to be bent with a predetermined curvature.

The display unit 151 may be divided into a fixed portion and a variable portion. The fixed portion means a portion fixed to the frame. Because of being fixed to the frame, the fixed portion maintains a constant shape without changing a bending degree. On the other hand, the variable portion means a portion in which a bending angle or a position of the bent portion changes. The variable portion in which the position or bending angle of the bent portion changes requires a structure for supporting a rear face of the variable portion in response to the change.

The fixed portion is coupled to the first frame of the display unit and is always positioned on the front face of the display unit to form a portion of the front face of the display unit. The variable portion includes a side face located at a side portion of the mobile terminal, and a position of the side face varies depending on the position of the second frame. Based on a side face, an area of a portion disposed on the front face of the display unit and an area of a portion disposed on the rear face of the display unit vary. That is, a portion of the variable portion may be the front face and another portion of the variable portion may be the rear face based on the first and second states. The variable portion is positioned in the first direction with respect to the fixed portion relative to the mobile terminal, and an end of the variable portion is bent toward the rear face of the mobile terminal and slides on the rear face of the second frame.

The end of the variable portion of the display unit is coupled with a slide frame that guides the variable portion to slide move on the rear face of the second frame, and the slide frame moves in the first direction at the same time as the second frame moves in the first direction. As a result, a moving distance of the slide frame with respect to the first frame is twice as a moving distance of the second frame with respect to the first frame. Further, as shown in FIG. 4, the first rear portion 1012 of the mobile terminal 100 includes an exposed rear portion 1013 that is exposed to the outside without being covered by the display unit 151 even in the first state. The physical input unit 120 for the manipulation of the mobile terminal 100 such as various buttons, switches, the camera 121, and a flash, and the sensing unit 140 such as the proximity sensor 141 or a fingerprint sensor may be arranged on the exposed rear portion 1013. The first rear portion 1012 except for the exposed rear portion 1013 may be covered by the display unit 151 in the first state as shown in FIG. 4A, and may be exposed rearwardly in the second state as shown in FIG. 4B.

In a conventional bar-shaped terminal, a display unit is provided only on a front face of the terminal. Therefore, a main camera is placed on a rear face of the terminal in order for the user to capture an object at an opposite side while looking through the display unit. On the other hand, an additional auxiliary camera is required to be disposed on the front face of the terminal in order for the user to capture himself or herself while viewing himself or herself through the display unit.

However, the display unit 151 is positioned both the front face and the rear face of the mobile terminal 100 of the present disclosure. Therefore, when the user captures himself or herself, a display unit on the same face as the camera 121, that is, the portion of the display 151 on the rear face of the mobile terminal 100 in the drawing may be used. Further, when the user captures the object on the opposite side of the user, a display unit on the opposite face of the camera 121, that is, the portion of the display unit 151 on the front face of the mobile terminal 100 in the drawing may be used. For this reason, the mobile terminal 100 may capture the object on the opposite side of the user and capture the user using the single camera 121. The camera may include a plurality of cameras having different angles of view, such as wide angle, super wide angle, and telephotographic cameras. In addition to the camera, a proximity sensor, the audio output module, and the like may be positioned on the exposed rear portion 1013, and an antenna 116 may be installed on the exposed rear portion 1013. In order to protect the camera, the sensor, and the like of the exposed rear portion 1013 and in consideration of a design of an outer shape thereof, an exposed decor 1013 may be attached on the exposed rear portion 1013.

The side portion 1014 may extend along edges of the first front portion 1011 and the first rear portion 1012 to surround the first frame 101, and may form the outer shape of the mobile terminal 100. However, as mentioned above, since the second frame 102 is accommodated in the first frame 101 and is movably coupled thereto, in order to allow the movement of the second frame 102 relative to the first frame 101, a portion of the first frame 101 needs to be opened. As shown in FIG. 2, as an example, the second frame 102 is movably coupled to one of both side portions of the first frame 101, so that the side portion 1014 may not be formed on the side portion in the first direction, and thus, the portion of the first frame 101 may be opened. Accordingly, the first frame 101 may include a substantially closed first side portion 101a and a second side portion 101b, which is disposed to be opposite to the first side portion 101a and is opened. The side portion 1014 is exposed to the outside of the mobile terminal 100, so that an interface unit 160 for connecting a supply port or an ear jack, the user input unit 120 such as a volume button, or the like may be disposed on the side portion 1014. When containing a metal material, the side portion 1014 may serve as an antenna.

The second frame 102 may include a second front portion 1021 disposed at the front portion of the mobile terminal 100 and a second rear portion 1022 disposed at the rear portion of the mobile terminal 100. Like the first front portion 1011 and the first rear portion 1012 of the first frame 101, the second front portion 1021 and the second rear portion 1022 may be formed of plate-shaped members that are generally flat. In addition, the second frame 102 also accommodates various components, and must not interfere with the components accommodated in the first frame 101 during the movement. Accordingly, the second front portion 1021 and the second rear portion 1022 may be coupled to each other in a state of being spaced apart from each other to define a predetermined space therebetween, and may have shapes that do not interfere with the components in the first frame 101.

In addition, the display unit 151 may be bent 180 degrees while being rolled in the second frame 102 to be disposed on both the front face and the rear face of the mobile terminal 100. For such an arrangement of the display unit 151, the second frame 102 may include a driving roller 1028 rotatably disposed therein. The driving roller 1028 may be disposed at any position inside the second frame 102. However, the display unit 151 should be spread flat on the front face and the rear face of the mobile terminal 100 to provide a good quality screen to the user. Further, for such spread, a proper tension must be provided on the display unit 151. In order to provide the proper tension, the driving roller 1028 may be disposed at a first directional end of the second frame 102. The driving roller 1028 may extend in the third direction, and may be rotatably coupled to the second frame 102.

The display unit 151 may be rolled around the driving roller 1028 while being gently bent with a predetermined curvature. The flexible display unit 151 may include a first face on which a video is output and exposed to the outside and an inner face facing the frame at the opposite side. The driving roller 1028 may be installed to rotate freely in the second frame 102 while being in contact with the inner face of the display unit 151. Accordingly, the driving roller 1028 may actually move the display unit 151 in a lateral direction of the mobile terminal 100, that is, in a direction perpendicular to a longitudinal direction. As will be described later, when the second frame 102 slides, because of the tension applied by the second frame 102, the display unit 151 moves to the front face or the rear face of the mobile terminal 100 in different directions (i.e., the first direction D1 or the second direction D2) relative to the second frame 102. The driving roller 1028 may guide such movement while rotating.

In addition, the driving roller 1028 is disposed on a first side portion 102a of the second frame 102, and the first side portion 102a actually corresponds to an outermost side portion of the mobile terminal 100. When the first side portion 102a of the second frame 102 is exposed, the display unit 151 rolled on the driving roller 1028 may be damaged. Accordingly, the second frame 102 may include a side frame 1024 disposed on the first side portion 102a.

The side frame 1024 extends in the longitudinal direction of the second frame 102 to cover the first side portion 102a, thereby protecting the driving roller 1028 and the display unit 151 rolled thereon.

Because the side face is rolled by the roller, the side face is bent with the predetermined curvature, and an inner face of the side frame may include a curved face corresponding to the curvature of the side face.

Because of the side frame 1024, the second frame 102 may have the substantially closed first side portion 102a, and the side frame 1024 may substantially form the outer shape of the mobile terminal 100 together with the side portion 1014 of the first frame 101. In addition, the second frame 102 may include a second side portion 102b that is disposed opposite the first side portion 102a to minimize interference with the components within the first frame 101 during the movement, and is opened.

Such a second frame 102 is movably coupled to the first frame 101, and thus may slide in the predetermined first or second direction D1 or D2 relative to the first frame 101. More specifically, the second frame 102 may be movably coupled to the first frame 101 through the side portion of the first frame 101, more precisely, through the opened second side portion 101b, as shown. More specifically, the second side portion 102b of the second frame is disposed relatively adjacent to the first side portion 101a of the first frame 101 which is closed. Accordingly, the first side portion 102a of the second frame may be disposed to be opposite to the first side portion 101a. Accordingly, the second side portion 102b is inserted into the first frame 101 through the side portion of the first frame, that is, the second side portion 101b thereof. The first side portion 102a is not inserted into the first frame 101 but is always located outside the first frame 101, thereby forming the outer shape of the mobile terminal 100 as described above. However, when necessary, such first side portion 102b of the second frame 102 may also be inserted into the first frame 101.

Because of such positional relationship, the second frame 102 may extend from or contract to the first frame 101 in a direction perpendicular to the longitudinal direction of the mobile terminal 100 or the first frame 101. That is, the first and second directions D1 and D2 may basically be directions perpendicular to the longitudinal direction of the mobile terminal 100 or the first frame 101. Further, the first and second directions D1 and D2 may also be described as the lateral direction or the horizontal direction of the mobile terminal 100 or the first frame 101. In addition, during the movement in the first direction D1, the second frame 102 extends from the first frame 101. Accordingly, the first direction D1 may be a direction in which the second frame 102 moves away from the first frame 101, that is, moves outwardly of the mobile terminal 100 or the first frame 101. On the other hand, during the movement in the second direction D2, the second frame 102 contracts to the first frame 101. Thus, the second direction D2 is a direction opposite to the first direction D1, so that the second direction D2 may be a direction in which the second frame 102 moves to become closer to the first frame 101, that is, moves inwardly of the mobile terminal 100 or the first frame 101. When being moved in the first direction D1, such second frame 102 extends and applies a force to the portion of the display unit 151 disposed on the rear face of the mobile terminal 100, so that the portion of the display unit 151 may be disposed on the front face of the mobile terminal 100, and a region for such additional arrangement may be defined. Thus, the second frame 102 may convert the mobile terminal 100 into the second state with the display unit 151 with the relatively extended front face by moving in the first direction D1. On the other hand, when being moved in the second direction D2, the second frame 102 contracts into an original state thereof, and applies a force to the portion of the display unit 151 disposed on the front face of the mobile terminal 100 to return to the rear face of the mobile terminal 100 again. Thus, the second frame 102 may convert the mobile terminal 100 into the first state with the display unit 151 with the relatively contracted front face by moving in the second direction D2. Accordingly, the second frame 102 selectively exposes the display unit 151 to the front face of the mobile terminal 100 depending on the moving direction (i.e., the first or second direction D1 and D2). Accordingly, the mobile terminal 100 may be converted into the first or second state defined above.

During the expansion and the contraction in such first and second directions D1 and D2, the second frame 102 may overlap the first frame 101, more precisely, the first front portion 1011 and the first rear portion 1012 thereof so as not to interfere with the first frame 101. More specifically, the display unit 151 may be coupled to and supported by the first front portion 1011 of the first frame 101, as described above. Accordingly, the display unit 151 does not need to be additionally supported by the second front portion 1021 of the second frame 102. Rather, when the second front portion 1021 is interposed between the first front portion 1011 and the display unit 151, the display unit 151 may be deformed or damaged because of friction with the second front portion 1021, which is repeatedly moved. Thus, the second front portion 1021 may be disposed below the first front portion 1011, or may be interposed between two first front portions 1011. The second rear portion 1022 of the second frame 102 may be disposed rearward of the first rear portion 1012 of the first frame 101. That is, the front face of the second rear portion 1022 may face the rear face of the first rear portion 1012. In addition, the rear face of the first rear portion 1012 may be in contact with the front face of the second rear portion 1022 to stably support the movement of the second frame 102. Because of such arrangement, the second rear portion 1022 may be exposed to the outside of the first frame, more precisely, of the first rear portion 1012, and may be coupled to the display unit 151.

In addition, the second frame 102 may extend and contract the size of the mobile terminal 100 itself, particularly the front face of the mobile terminal 100 by the extension and the contraction in the first and second directions D1 and D2. Thus, the display unit 151 must move by such extended or reduced front face size to obtain the intended first and second states. However, when being fixed to the second frame 102, the display unit 151 may not be moved smoothly to be adapted for the front face of the mobile terminal 100 that is extended or contracted. For this reason, the display unit 151 may be movably coupled to the second frame 102.

More specifically, the display unit 151 may include a first side edge (or side end) 151d disposed on the front face of the mobile terminal 100 and a second side edge 151e opposite to the first side edge 151d and disposed on the rear face of the mobile terminal 100. The first side edge 151 may be disposed on the front face of the first frame 101, that is, the front face of the first front portion 1011 thereof, and may be disposed adjacent to the side portion of the mobile terminal 100, that is, the first side portion 101a of the first frame. On the other hand, since the second side edge 151e is adjacent to the rear face of the mobile terminal 100 and the second rear portion 1022 of the second frame 102, the second side edge 151e may is be coupled the second rear portion 1022 of the second frame 102 to be movable in the first and second directions D1 and D2. In addition, since the display unit 151 is not structurally strong, a slide frame 103 may be coupled to the second side edge 151e. The slide frame 103 may be formed of a plate-shaped member extending in the longitudinal direction of the mobile terminal 100.

Accordingly, the second frame 103 may be coupled to the second frame, that is, the second rear portion 1022 thereof to be movable in the first and second directions D1 and D2 instead of the second side edge 151e. In addition, the second frame 102 may include a slot 1025 extending in the lateral direction of the mobile terminal 100 or the second frame 102, that is, the direction perpendicular to the longitudinal direction thereof. Further, the slide frame 103 may be stably moved while being guided by the slot 1025. The slide frame 103 may include, for example, a projection inserted into the slot 1025 for the movement along the slot 1025.

Referring to FIGS. 3 to 5, in connection with such configuration of the first to third frames 101, 102, and 103, the display unit 151 may include a first region 151a extending from one side thereof, that is, the first side edge 151d toward the opposite second side edge 151e by a predetermined length, and a second region 151b disposed opposite the first region 151a, and extending from the second side edge 151e toward the first side edge 151d by a predetermined length. In addition, the display unit 151 may include a third region 151c disposed between the first and second regions 151a and 151b. Such first to third regions 151a, 151b, and 151c may be connected to each other, and may form a continuous body of the display unit 151. In addition, as described above, for the movement of the third region 151c toward the front face or the rear face of the mobile terminal 100 depending on the moving direction of the second frame 102, the first region 151a may be fixed so as not to move to the front face of the mobile terminal 100, and the second region 151b may be provided to be movable on the rear face of the mobile terminal. Such configuration of the display unit 151 will be described in more detail below.

The first region 151a may be disposed on the front face of the mobile terminal 100, more specifically, the first frame 101, that is, on the front face of the first front portion 1011. The first region 151a is fixed to the first frame 101, that is, the front face of the first front portion 1011 so as not to be moved during the movement of the second frame 102, and thus, the first region 1511 may always be exposed to the front face of the mobile terminal 100.

The third region 151c may be adjacent to the first region 151a in a direction of the second side edge 151e, and may extend into the second frame 102 and rolled on the driving roller 1028. The third region 151c may consecutively extend out of the second frame 102 again and partially cover the second frame 102, that is, the rear face of the second rear portion 1022. Further, the second frame 102, that is, the second rear portion 1022, is adjacent to the first frame 101, that is, the first rear portion 1012 and together forms the rear case of the mobile terminal 100, so that it may be described that the third region 151c is also disposed on the rear face of the first frame 101.

The second region 151b may be adjacent to the third region 151c in the direction of the second side edge 151e and may be disposed on the rear face of the mobile terminal 100, more specifically, on the second frame, that is, the rear face of the second rear portion 1022 thereof. The second region 151b may be coupled to the slide frame 103 without being directly coupled to the second frame 102. As shown in FIG. 4B, the slot 1025 extending in the lateral direction (i.e., the direction perpendicular to the longitudinal direction of the mobile terminal 100) to the second frame 102, that is, to the second rear portion 1022 is defined. Further, the slide frame 103 may move along the slot 1025. In FIG. 4B, it is shown that the slot 1025 is defined in the rear face of the second frame 102, but may be defined in the side face of the second frame 102.

Although the second region 151b may move in the first or second direction D1 or D2 with respect to the second frame 102 together with the slide frame 103, the movement of the second region 1512 may be restricted within the rear face of the mobile terminal 100 by the slot 1025. That is, the second region 1512 does not move out of the second frame 102 even when the second frame 102 is extended or contracted, and may move along the slot 1025 within the second frame 102 by the extended or contracted distance of the second frame 102. Accordingly, the second region 1512 may always be exposed to the rear face of the mobile terminal 100.

As a result, the first region 151a may be disposed on the front face of the mobile terminal 100 and may be always exposed to the front face regardless of the movement of the second frame 102, and the second region 151b may be disposed on the rear face of the mobile terminal 100 and may be always exposed to the rear face regardless of the movement of the second frame 102. In addition, the third region 151c may be disposed between the first and second regions 151a and 151b, and may be selectively placed on the front face or the rear face of the mobile terminal 100 depending on the moving directions D1 and D2 of the second frame 102.

Because of such selective placement of the third region 151c, as shown in FIG. 4B, the first rear portion 1012 of the first frame 101 may be exposed to the outside of the mobile terminal 100 because the first rear portion 1012 is covered by the second and third regions 151b and 151c and the second rear portion 1022 of the display unit 151 in the first state, but, in the second state, the third region 151c moves to the front face of the mobile terminal 100 and the second rear portion 1022 also moves in the first direction D1. In addition, the second front portion 1021 of the second frame 102 is hidden by the first front portion 1011 of the first frame 101 in the first state, but, in the second state, moves out of the first frame 101 to support the third region 151c of the display unit 151 disposed on the front face of the mobile terminal 100.

In order to prevent the second front portion 1021 from affecting the internal components during the slide movement, a separating plate 1017 may be further disposed rearward of the second front portion 1021 and fastened with the first front portion 1011. The second front portion 1021 may move between the first front portion 1011 and the separating plate 1017 based on the slide movement of the second frame.

However, the third region 151c may be rolled on the driving roller 1028 and bent in the second frame 102. When converting from the first state to the second state, the third region 151c may extend from the second frame 102 to the front face of the mobile terminal 100 while being rolled on the driving roller 1028 in one direction. On the other hand, when converting from the second state to the first state, the third region 151c may be retracted from the front face of the mobile terminal 100 to the second frame 102 while being rolled on the driving roller 1028 in the opposite direction, and at the same time, may return to the rear face of the mobile terminal 100 from the second frame 102.

A specific location of the foldable mobile terminal in a form of being spread like a book is easily damaged because only the specific location is folded repeatedly. On the other hand, the deformed portion of the flexible display unit 151, that is, a portion rolled on the driving roller 1028, may vary based on the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing damage to the display unit 151.

Based on the above-described configuration, overall operations of the mobile terminal 100 will be described as follows. As an example, the state conversion may be performed manually by the user, and an operation of the mobile terminal 100 during such manual state conversion will be described. However, operations of the first to third frames 101 to 103 and the display unit 151, which will be described below, may be performed in the same manner when a power source other than a user's force is used, for example, when the driving unit 200 to be described below is applied.

A rear face cover 1023 may be further disposed on a rear face of the second rear portion 1022 such that the rear face of the display unit positioned on the rear face of the mobile terminal 100 is not exposed to the outside. The rear face of the display unit may be used in the first state when the rear face cover 1023 uses a transparent material, and the rear face of the display unit may be covered such that the movement of the slide frame 103 is not exposed when the rear face cover 1023 uses an opaque material. That is, the second region and the third region of the slide frame 103 and the display unit 151 may move in the first direction and in the second direction in a space between the second rear portion 1022 and the rear face cover 1023. The exposed decor 1013 may be further attached to the exposed rear portion of the first rear portion 1012 to protect the camera 121, the sensor 140, and the like. The exposed decor 1013 may be partially coated on a plate-shaped member made of a transparent glass material to cover the internal components, and may be not coated only on a required portion to allow light to reach the camera 121, the flash or the sensing unit 140, and the like.

Figure 6:
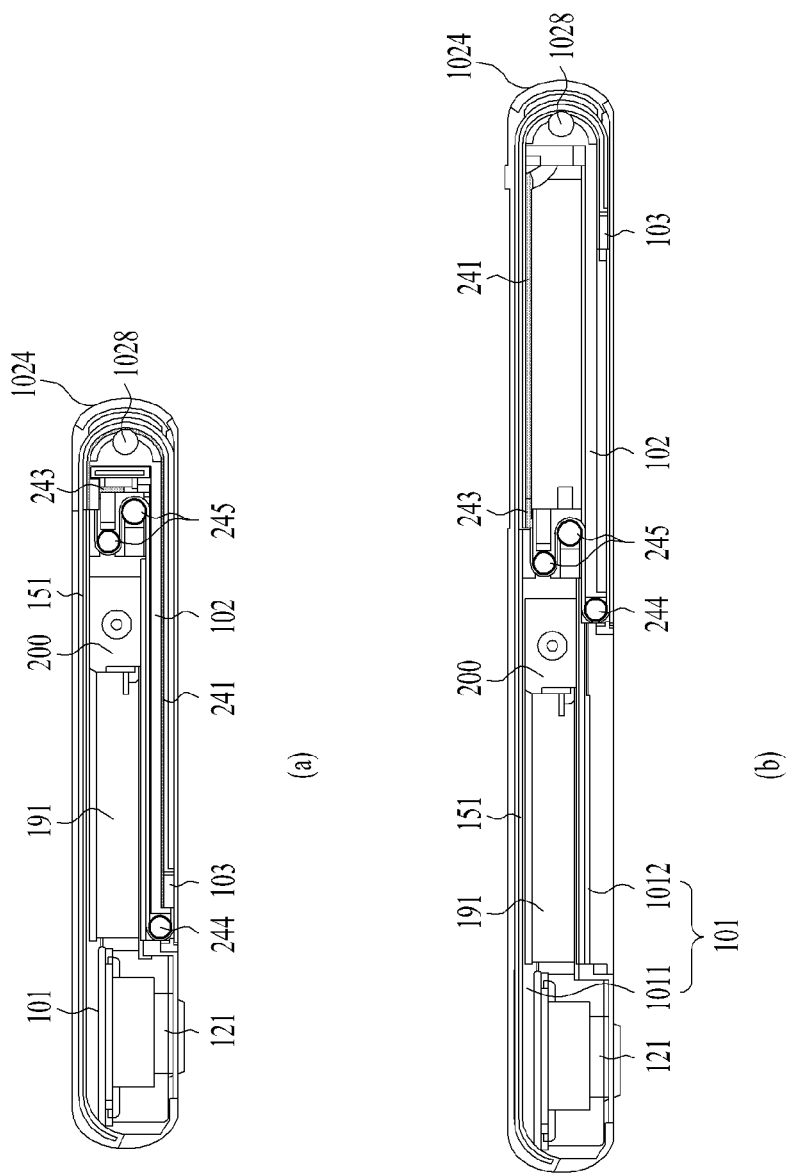
FIG. 6 illustrates cross-sectional views taken along a line C-C and a line D-D of FIG. 3.

FIG. 6 illustrates cross-sectional views taken along a line C-C and a line D-D of FIG. 3. Further, FIG. 6 illustrates a tensioning structure for applying a tensile force to the display unit 151. The first region 151a of the display unit 151 is fixed to the first frame 101, but the slide frame 103 coupled with the second region 151b moves, and the third region 151c is not fixed to the frame. Therefore, the third region 151c of the display unit 151 may be separated from the frames 101, 102, and 103 without being attached to the frames 101, 102, and 103. The display unit 151 should be in close contact with the frames 101 and 102 to maintain a flat state, so that the screen outputted on the display unit 151 may not be distorted, and malfunctions may be prevented during touch input.

In order to maintain the display unit 151 in the flat state, a structure that slides in the first direction while supporting the third region of the display unit 151 on the frame may be disposed. For example, rails may be arranged at both sides of the display unit 151 in a direction perpendicular to the first direction, and the rails may support the display unit 151 so as not to be separated from the frame while ends of the display unit 151 respectively move along the rails.

However, even when the both ends of the display unit 151 in the third direction are respectively caught by the rails, a central portion of the display unit 151 in the third direction may not be pulled, so that the third region 151c of the display unit 151 may not be in close contact with the second frame 102 and may not maintain the flat state. In order to keep an entirety of the display unit 151 flat, a member for providing a tensile force of pulling the display unit 151 in both first and second directions is required.

Because the first region 151a of the display unit 151 is fixed to the first frame 101, a force of pulling the second end of the display unit 151 in the second direction from the rear face of the mobile terminal 100 is required. The force of pulling in the second direction should be constant regardless of the state of the mobile terminal 100, so that a conventional elastic member may not be able to be used. The conventional elastic member provides an elasticity varying depending on a length, so that the pulling force may vary based on a position of the second end of the display unit 151.

In order to solve the above-mentioned problem, and in order to provide the force of pulling the second end of the display unit 151 in the second direction, a tensioning structure that provides a constant force of pulling the slide frame 103 positioned at the second directional end of the display unit 151 is disposed.

The tensioning structure includes a tensioning belt 242 and a belt roller 244. The tensioning belt 242 is a member that pulls the display unit 151. One side of the tensioning belt 242 may be fixed to the first frame 101 and the other side thereof may be fixed to the second end of the display unit 151. Because the second end of the display unit 151 is fixed to the slide frame 103, the other end of the tensioning belt 242 may be coupled to the slide frame 103. A fastener 243 may be disposed such that the fastener 243 is easily fastened with the first frame 101 and the slide frame 103, and a force of the tensioning belt 242 is transmitted to the entirety of the display unit 151.

As shown in FIG. 6, the tensioning belt 242 is disposed to be bent at least once without being disposed in a straight line between the first frame 101 and the display unit 151. The tensioning belt 242 is bent while being wound around the belt roller 244 located on the second frame 102. A position of the first frame 101 to which the tensioning belt 242 is coupled is a position adjacent to the first directional end of the first frame 101, which is a position maintaining an overlapped state with the second frame 102 in the second state. The belt roller 244 may be located at the end of the second frame 102 in the second direction. In order to secure a mounting space inside, a diameter of the belt roller 244 may be smaller than a diameter of the driving roller 1028 located at a point at the first directional end of the second frame 102 and at which the display unit 151 is bent.

The tensioning belt 242 includes a first belt between the first frame 101 and the belt roller 244 and a second belt between the belt roller 244 and the slide frame 103. A sum of lengths of the first belt and the second belt is constant, and when a state of the mobile terminal 100 is converted from the first state to the second state, a length of the first belt is reduced and a length of the second belt is increased.

When the state of the mobile terminal 100 is converted from the first state to the second state, the second frame 102 moves in the first direction, so that the first directional end of the first frame 101 and the second directional end of the second frame 102 become close to each other, and thus, the length of the first belt is reduced. Further, because the slide frame 103 moves in the first direction with respect to the second frame 102 when the second frame 102 moves in the first direction, the length of the second belt is increased. Regardless of the first state and the second state, a length of the tensioning belt 242 may be maintained constant, so that the second end of the display unit 151 may be pulled in the second direction from the rear face of the mobile terminal 100 to be kept in a taut state.

Figure 7:
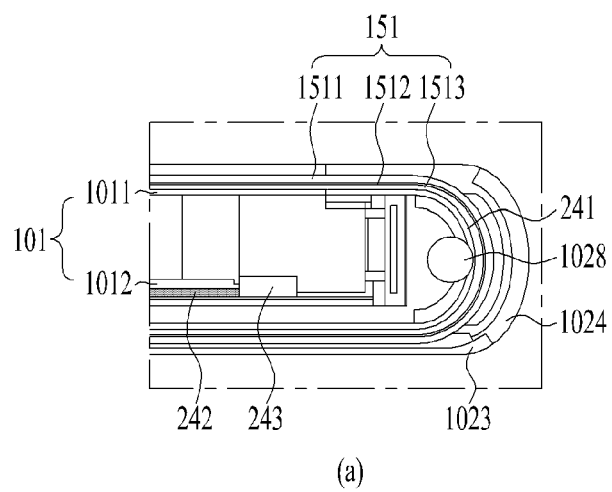
FIG. 7 illustrates a tensioning structure coupled to a display unit.
Figure 7:
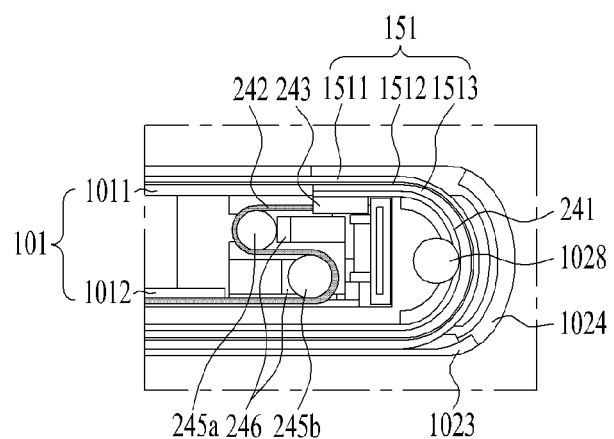

FIG. 7 illustrates embodiments of the first end of the tensioning belt coupled to the first frame 101. As shown in FIG. 7A, the tensioning belt may be coupled to the first frame 101 at a position of the first frame 101 adjacent to the first direction, and the first belt 2421 may be coupled to the first rear portion 1012 positioned at a rear portion of the first frame 101 without being bent. When the tensioning belt 242 itself has a small elasticity, a minute length change may be offset when the third region 151c of the display unit 151 moves to the front face or the rear face of the display unit 151. However, when the tensioning belt 242 itself does not have the elasticity, a smooth operation may not be performed when the state of the mobile terminal 100 is converted.

In another embodiment, as shown in FIG. 7B, the tensioning belt 242 may be bent twice to place a first end of the tensioning belt 242 at the first front portion of the first frame 101. The tensioning belt 242 may further include a pair of tensioning pins 245 such that the tensioning belt 242 is bent twice, and the tensioning belt 242 may be bent twice in an S shape while surrounding the pair of tensioning pins 245. Each tensioning pin 245 may further include each elastic body 246 having one side thereof abutting on the tensioning belt 242 and the other side thereof exerting a force on the tensioning pin 245 toward the tensioning belt 242. The tensioning pin 245 is positioned on the first frame 101, and the elastic body 246 is also a member fixed to the first frame 101 and does not move along the second frame 102 when the state of the mobile terminal 100 is converted.

The elastic body 246 has a restoring force of being restored to an original shape thereof after deformed when a force is applied, like silicon or rubber. Thus, when the display unit 151 moves, the tensioning belt 242 may be pulled to push the tensioning pin 245 toward the elastic body 246, but may be restored to an original state thereof after being deformed, so that the tensioning belt and the display unit 151 may be remained in the taut state.

When the state of the display 151 is converted, the elastic body 246 may receive a force with which the tensioning belt is pulled as the shape of the elastic body 246 changes, so that the display unit 151 may be stably moved while maintaining the taut state of the tensioning belt 232. In addition, the tensioning pin 245 and the elastic body 246 maintains the tensioning belt in a loose state before assembling the mobile terminal 100 for ease of the assembly, and pulls the tensioning belt 242 when assembling the mobile terminal 100 such that the tensioning belt 242 is assembled in the taut state. An assembly method will be described later.

Figure 8:
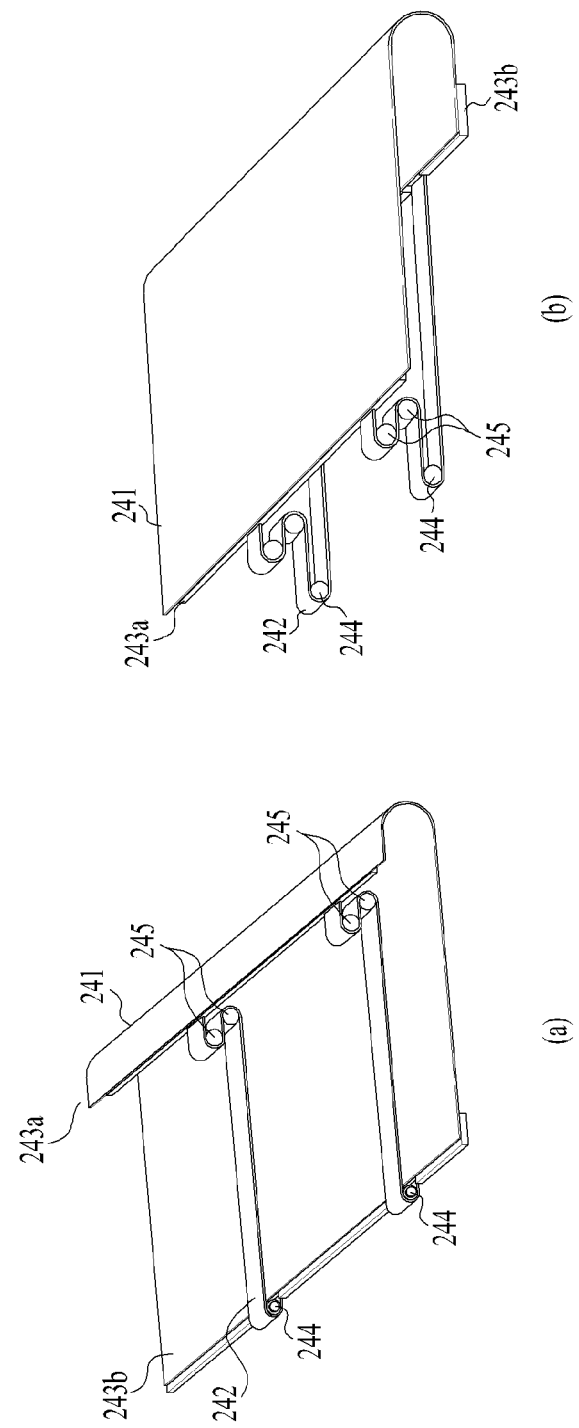
FIG. 8 illustrates a tensioning belt and a tensioning seat.

A tensioning seat 241 positioned on the rear face of the third region 151c of the display unit 151 to evenly transmit the force of the tensioning belt 242 to the display unit 151 may be further included. FIG. 8 illustrates the tensioning structure of the mobile terminal, and illustrates a tensioning seat 241, the tensioning belt 242, the belt roller 244, and the tensioning pin 245. The tensioning seat 241 may be located on the rear face of the third region 151c, and may made of a fabric material. In order to stably support the rear face of the third region 151c even in the second state, the tensioning seat 241 may be integrally formed with a display frame.

The display frame includes a plurality of support bars extending in the third direction on the rear face of the third region 151c. The plurality of support bars are arranged in parallel with each other in the first direction to support the rear face such that the third region 151c of the display unit 151 is bent in the first direction but does not sag in the third direction. One face of the tensioning seat 241 may be coupled to the display unit 151 and the other face of the tensioning seat 241 may be coupled to the display frame including the plurality of support bars.

FIG. 8A illustrates the tensioning structure in the first state, and FIG. 8B illustrates the tensioning structure in the second state. The fasteners 243 respectively located at both ends of the tensioning belt 242 may be formed in a rigid bar shape, and the tensioning seat 241 and the tensioning belt 242 may be fastened with each other through the fastener 243. The fasteners 243 may include a first fastener 243a coupled to the first frame 101 and a second fastener 243b coupled to the slide frame 103. Because the first fastener 243a and the tensioning pin 245 are fixed to the first frame 101, the first fastener 243a and the tensioning pin 245 may be fixed in both the first state and the second state. Further, the belt roller 244 and the second fastener 243b coupled to the second frame 102 may move in the first direction as shown in FIG. 8B. The tensioning belt 242 and the tensioning seat 241 may form a closed loop to prevent the display unit 151 from being separated.

Figure 9:
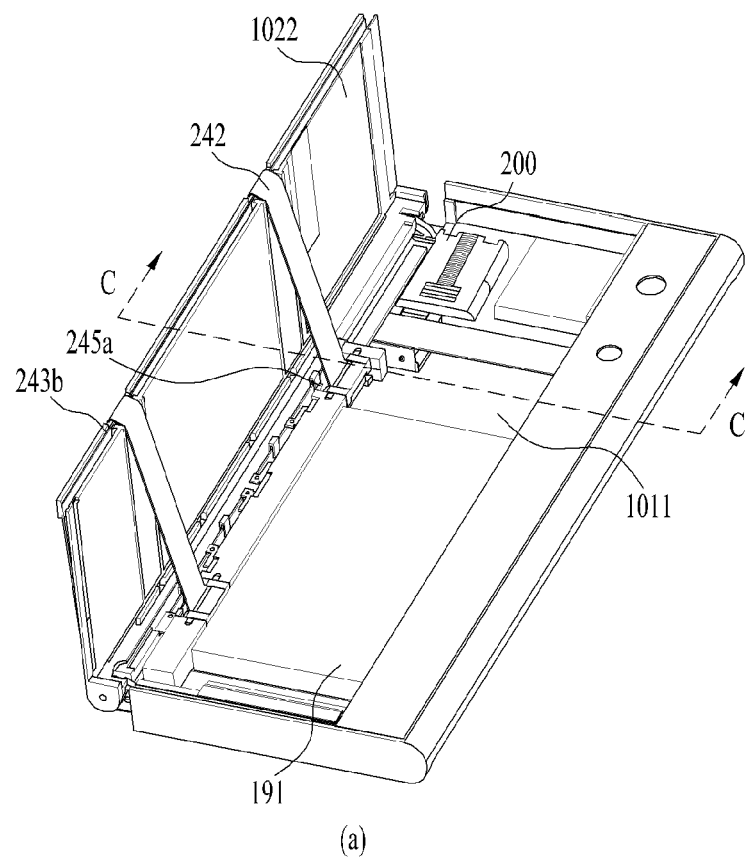
FIGS. 9 to 12 are diagrams illustrating an assembly flowchart of a mobile terminal.
Figure 9:
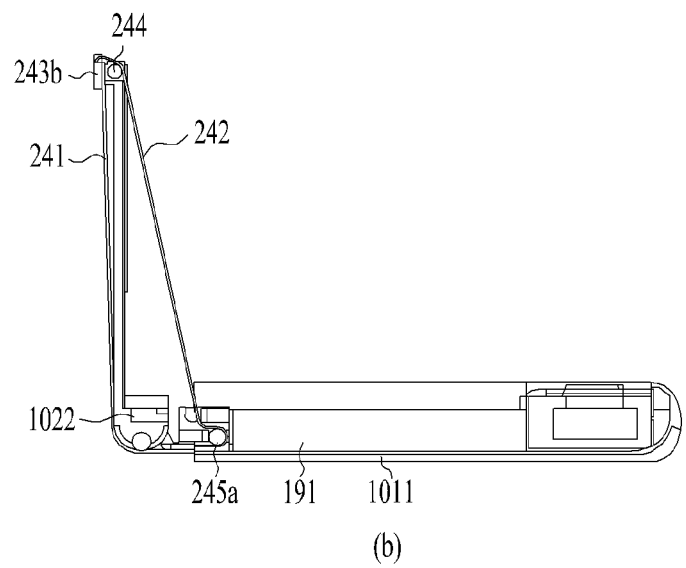
Figure 10:
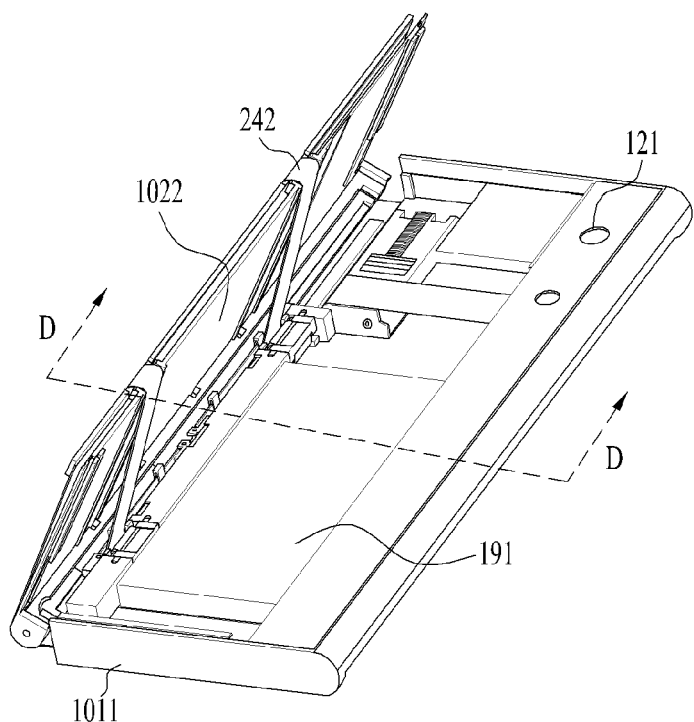
Figure 10:
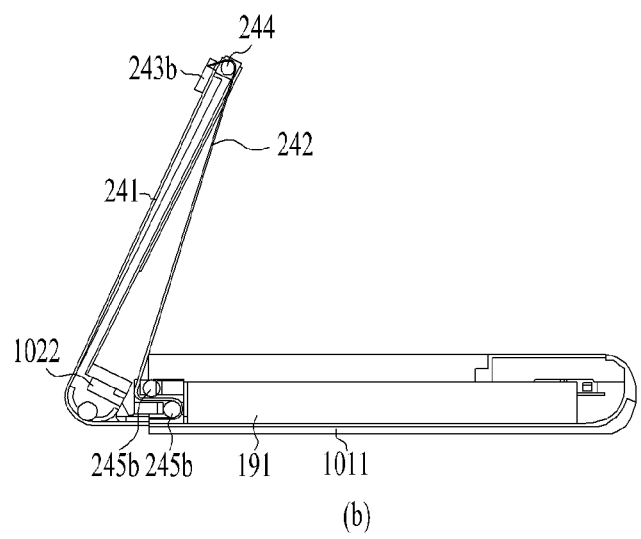
Figure 11:
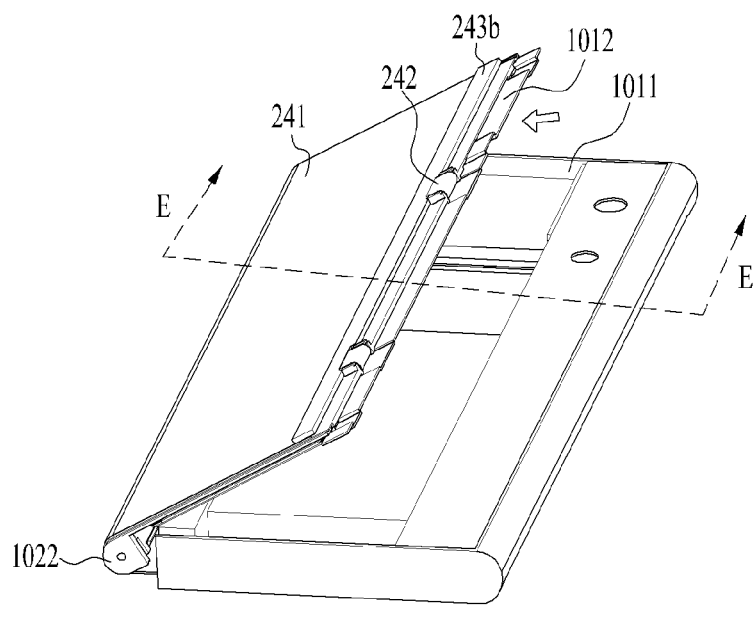
Figure 11:
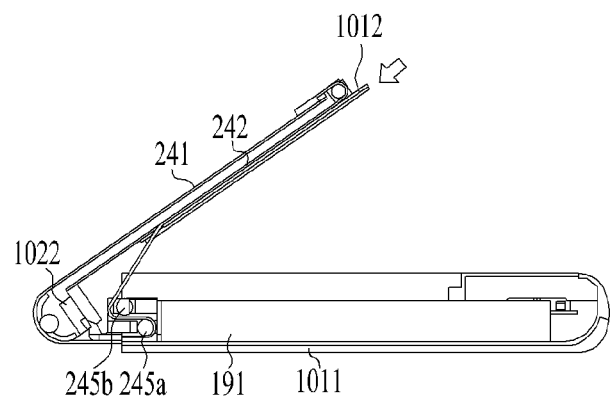
Figure 12:
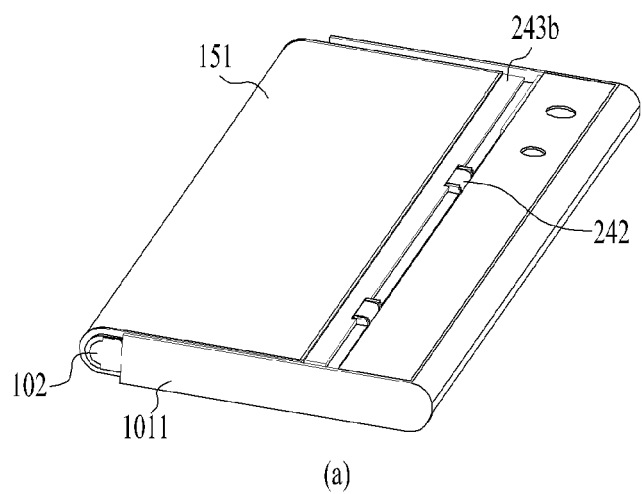
Figure 12:
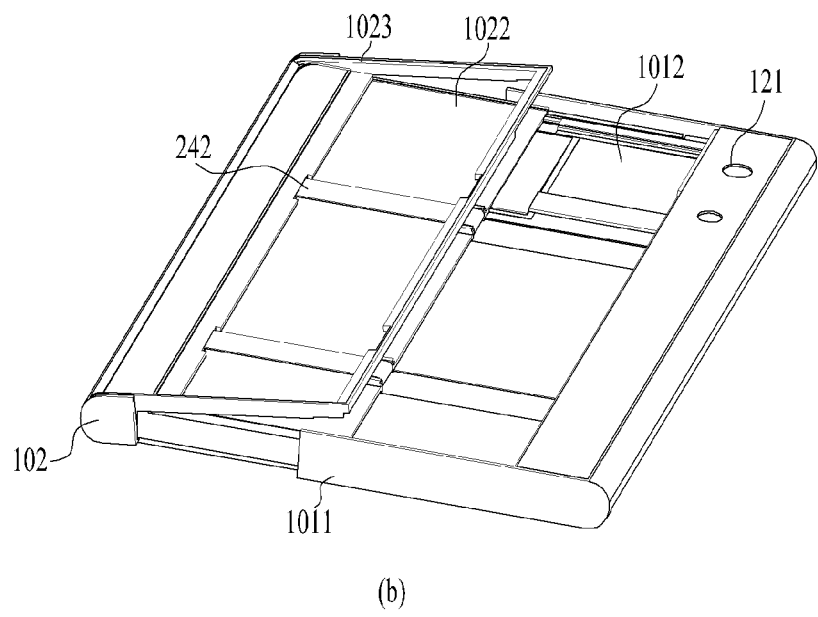

FIGS. 9 to 12 are diagrams illustrating an assembly flowchart of the same terminal. As shown in FIG. 9, components such as a battery, a driving unit, a camera, a board, and the like are mounted on the first frame 101. A front portion of the first frame 101 may be disposed at a bottom, and the front portion may be integrally formed with a side portion to define a mounting space therebetween. The second frame 102 is disposed in a vertical direction at a first directional end of the front portion (The rear face faces in an upward direction, and thus, the first direction is a left direction in the drawing.). The second frame 102 of the present embodiment includes the side portion on which the second rear portion and the driving roller are coupled. The tensioning seat 241 is wrapped on the second frame 102, and the tensioning belts 242 are respectively fastened to both ends of the tensioning seat 241. In this connection, the tensioning belt 242 may be disposed to wrap a portion of the tensioning pin 245 positioned on the front portion of the tensioning pin 245 positioned in the first direction of the first frame 101. As shown in FIG. 9B, before fastening the second frame 102 and the first frame 101 with each other, the tensioning belt 242 may be obliquely disposed to be spaced apart from the second frame 102. The second frame 102 covers a rear face of the front portion of the first frame 101 while rotating around an end where the driving roller is located, as shown in FIGS. 10 and 11. In this connection, when the second frame 102 is bent at a certain angle as shown in FIG. 10, the tensioning pin 245 may be further inserted to further add tension to the tensioning belt 242. Thereafter, as shown in FIG. 11, when the second frame 102 moves in the first direction and becomes in the second state, the first rear portion 1012 that covers the exposed rear face of the first frame 101 is inserted, so that the tensioning belt 242 is positioned between the second rear portion 1022 of the second frame 102 and the first rear portion 1012 of the first frame 101. When the first rear portion 1012 is inserted, the tensioning belt 242 may become in close contact with the second rear portion 1022, and may be pulled more strainedly.

Figure 13:
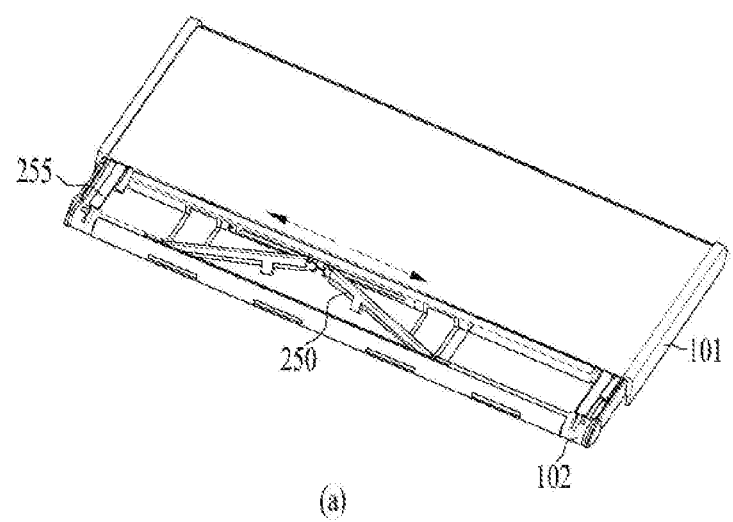
FIG. 13 illustrates a support structure based on states of a mobile terminal.
Figure 13:
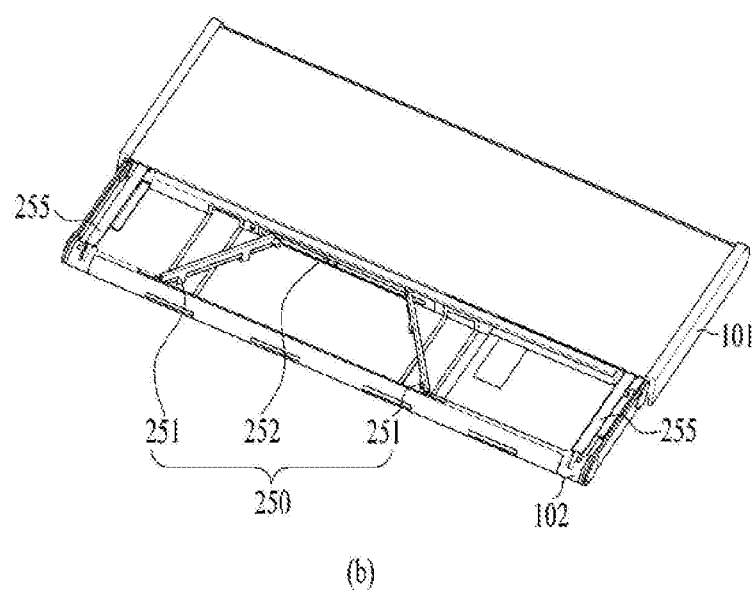
Figure 14:
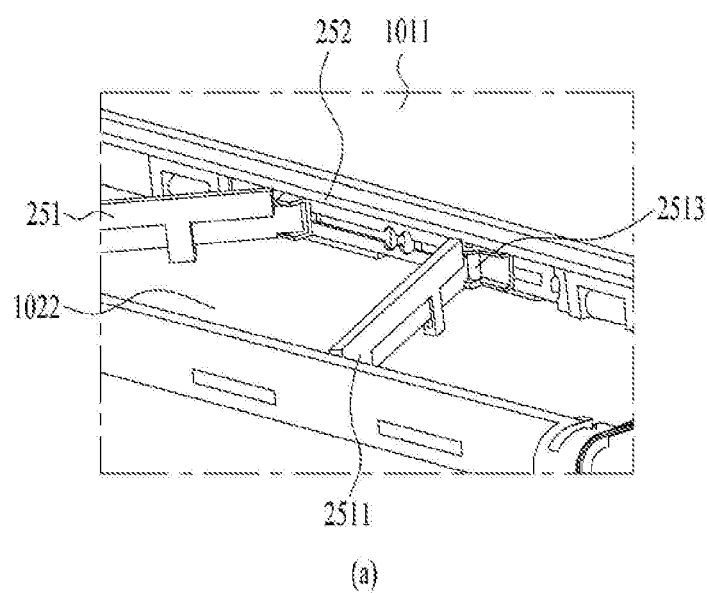
FIG. 14 is an enlarged view of the support structure of FIG. 13.
Figure 14:
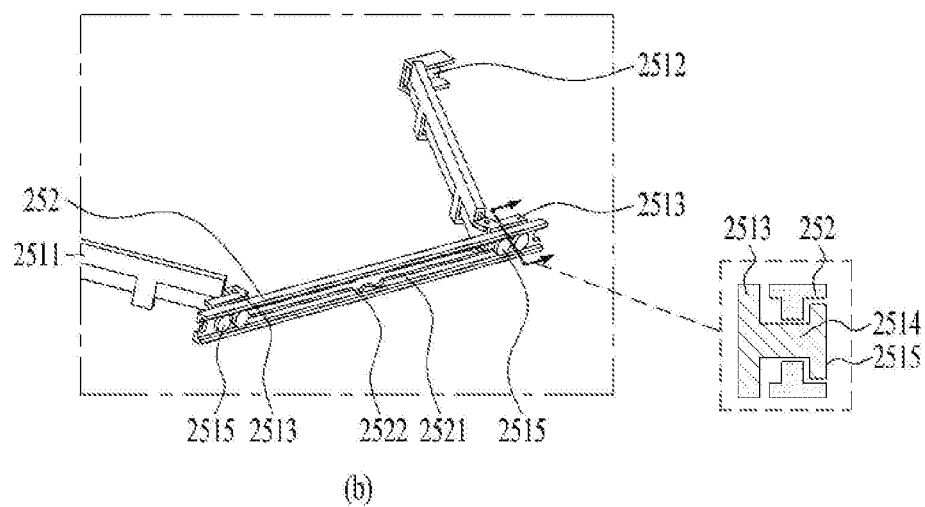

After fastening the second rear portion 1022 to the first frame 101, as shown in FIG. 12A, the display unit 151 may be attached to the tensioning seat 241, and the rear face cover 1023 that covers a portion the display unit 151 positioned at the rear face of the display unit 151 may be further attached to cover the display unit 151. The rear face cover 1023 may protect the portion of the display unit 151 located at the rear face of the display unit 151 in the first state, and may protect the tensioning belt 242 exposed to the rear face in the second state. FIG. 13 is a diagram illustrating a support structure based on the states of the mobile terminal 100, and FIG. 14 is an enlarged diagram of the support structure of FIG. 13. The first frame 101 and the second frame 102 of the mobile terminal viewed from the front in a state in which the display unit 151 is removed are illustrated. When the state is converted from the first state to the second state, a rear face of an extended portion of the second frame 102 becomes empty, and there is no structure supporting the rear face of the second region 151b of the display. Even when the second front portion 1021 is disposed, there is a problem that a thickness of the second front portion 1021 is increased in order to obtain a rigidity for supporting the empty space corresponding to the extended portion of the second frame 102. Even when the second front portion 1021 of the second frame 102 is omitted or there is the second front portion 1021, there is a need for a structure that supports the extended third region 151c of the display unit 151 without increasing the thickness of the second front portion 1021.

The present embodiment has a structure of a pivotable support link 251. The support link 251 may be disposed in the third direction in the first state, and unfolded in the second state and disposed in the second frame 102 obliquely or in the first direction as shown in FIG. 12B. The support link 251 disposed as shown in FIG. 12B may fill the empty space long in the third direction to prevent sagging of the third region 151c of the display unit 151. One end of the support link 251 is movable in the third direction, and the other end thereof is only pivotable and does not change in a position in the third direction. In the drawing, one end of the support link 251 is fastened to the first frame 101 and the other end thereof is fastened to the second frame 102, but may be configured in reverse.

One end of the support link 251 may be inserted into a link rail 252 fastened to the first frame 101 to move along the link rail 252. As shown in FIG. 13, when there are a pair of support links 251, the pair of support links 251 may be arranged in a symmetrical manner such that a spacing between one end of one support link 251 and one end of the other support link 251 is variable, or may be arranged in parallel with each other to move while maintaining a constant spacing.

Referring to FIG. 14B, each support link 251 has a first coupling hinge 2512 and a second coupling hinge 2513 respectively pivotably coupled to both ends of each support link 251. The first coupling hinge 2512 moves along the link rail coupled to the first frame 101, and the second coupling hinge 2513 is fixed to the second frame 102. The support link 251 may have a variable angle with the first frame 101 or the second frame 102 through the first coupling hinge 2512 and the second coupling hinge 2513, and a placement of the support link 251 may vary as shown in FIG. 13.

The link rail 252 is a groove-shaped rail extending in the third direction. A slide protrusion 2514 protruding from the first coupling hinge 2512 may be inserted into the rail and moved. The link rail 252 includes a first rail 2521 having a width of a first size and extending in the third direction and a second rail 2522 having a width of a second size. The first rail 2521 is an elongated section in which the slide protrusion 2514 protruding from the first coupling hinge 2512 is inserted and moved, and the second rail 2522 is a portion having a larger opening for inserting the slide protrusion 2514 therein.

An end of the slide protrusion 2514 includes an extended end 2515 such that the first coupling hinge 2512 is not departed from the link rail 252. A width of the extended end 2515 is larger than a width of the first rail 2521, so that the first coupling hinge 2512 is not departed from the first rail 2521. Further, the width of the extended end 2515 corresponds to or smaller than a width of the second rail 2522, so that the first coupling hinge 2512 may be inserted through the second rail 2522. As shown in FIG. 13, when the pair of support links move symmetrically, in the first state, one end of one support link 251 may be in contact with one end of the other support link 251, and the second rail 2522 may be positioned at a contact portion. The second rail 2522 may be formed in a shape corresponding to the shape of the extension end 2515. When the support links 251 are coupled one by one through the second rail 2522, and when the second coupling hinges 2513 are coupled to the second frame 102 such that one end of one support link 251 and one end of the other support link 251 are not positioned in the second rail 2522, the first coupling hinges 2512 of the support links 251 may move without departing from the link rail 252.

The support link 251 may have a height corresponding to a spacing between the second rear portion of the second frame 102 and the rear face of the display unit 151 in order to support the rear face of the extended third region 151c of the display unit 151. Such support link 251 is disposed in the third direction in the first state and a volume thereof is not that large. Further, the support link 251 is unfolded in the second state to stably support the extended rear face of the display unit 151.

As another example of the support structure of the display unit 151, a display support 255 positioned on the rear face of the first front portion 1011 of the first frame 101 in the first state and positioned in the rear face direction of the display unit 151 in the second state may be further included. The display support 255 may be extended like the second front portion 1012 of the second frame 102 described above and disposed on an entirety of the rear face of the third region 151c moved to the front face, or may also be partially disposed as shown in FIG. 13. According to the embodiment shown in FIG. 13, the display supports 255 may be respectively positioned at both ends in the third direction (up and down direction) to support the extended portion of the display unit 151 together with the support link 251. The display support 255 may extend or retract as long as a space is available.

As described above, the display unit 151 may be prevented from being separated when the state of the mobile terminal 100 is converted or in the converted state of the mobile terminal 100, thereby improving usability.

Even when the tensioning structure is added, because a driving resistance is small, a flatness of the display unit 151 may be increased without causing a decrease in driving force of the mobile terminal 100.

Because a uniform tensile force may be applied at all times, so that free stop is available in any state.

In addition, because the tensile force is not directly applied to the display unit 151 using the tensioning seat 241, a reliability of the display unit 151 may be improved.

Effects as not described herein may be derived from the above configurations. The relationship between the above-described components may allow a new effect not seen in the conventional approach to be derived.

In addition, embodiments shown in the drawings may be modified and implemented in other forms. The modifications should be regarded as falling within a scope of the present disclosure when the modifications are carried out so as to include a component claimed in the claims or within a scope of an equivalent thereto.

What is claimed is:
1. A mobile terminal comprising:
a first frame;
a second frame movable in a first direction from the first frame to convert a state of the mobile terminal from a first state to a second state, and slidable in a second direction opposite to the first direction to convert the state of the mobile terminal from the second state to the first state;
a slide frame movable in the first direction or in the second direction with respect to the second frame;
a flexible display device including a first region coupled to the first frame, a second region coupled to the slide frame, and a third region positioned between the first region and the second region and bent to surround the second frame;

a tensioning belt having a first end fixed to the first frame and a second end coupled to the slide frame; and a belt roller positioned at a second directional end of the second frame, wherein the tensioning belt is wound around the belt roller.

2. The mobile terminal of claim 1, wherein the first end of the tensioning belt is disposed adjacent to a first directional end of the first frame.

3. The mobile terminal of claim 2, wherein the first frame includes a first front portion coupled with the first region of the flexible display device and a first rear portion spaced behind the first front portion, wherein the second frame includes a second rear portion located on a rear surface of the first rear portion when the mobile terminal is in the first state, and wherein the belt roller has a diameter corresponding to a thickness of the second rear portion.

4. The mobile terminal of claim 2, further comprising a pair of tensioning pins arranged at the first directional end of the first frame and arranged in a vertical direction, and wherein the tensioning belt is wound around the pair of tensioning pins in an S-shape, wherein the first end of the tensioning belt is coupled to a first front portion of the first frame.

5. The mobile terminal of claim 4, wherein the tensioning belt is in contact with a first side of a tensioning pin of the pair of tensioning pins, and wherein the mobile terminal further includes an elastic body for pressing a second side of the tensioning pin.

6. The mobile terminal of claim 4, wherein the mobile terminal further includes a tensioning seat positioned on respective rear surfaces of the second region and the third region of the flexible display device, wherein both ends of the tensioning seat are coupled to the first end of the tensioning belt.

7. The mobile terminal of claim 1, further comprising:

a link rail coupled to one of the first frame or the second frame, and extending along a third direction perpendicular to the first direction; and a support link having a first end movable along the link rail and a second end coupled to the other of the first frame or the second frame.

8. The mobile terminal of claim 7, wherein the support link is disposed in the third direction perpendicular to the first direction when the mobile terminal is in the first state, and wherein the support link supports the third region of the flexible display device while traversing an extended portion of the second frame when the mobile terminal is in the second state.

9. The mobile terminal of claim 7, wherein the support link includes:

a first coupling hinge pivotably coupled to the first end of the support link, and fastened to the link rail; and a second coupling hinge pivotably coupled to the second end of the support link, and fixed to one of the first frame or the second frame.

10. The mobile terminal of claim 9, wherein the link rail includes a first rail having a width of a first amplitude and a second rail having a width of a second amplitude greater than the first amplitude, and wherein the first coupling hinge includes a slide protrusion having a thickness corresponding to the width of the first rail, and an extended end positioned at an end of the slide protrusion and having a diameter corresponding to the width of the second rail.

11. The mobile terminal of claim 10, wherein the second rail is disposed at a center, and the first rail comprises a pair of rails arranged symmetrically, and wherein a pair of support links are symmetrically arranged in the third direction, and wherein first coupling hinges of the pair of support links move in opposite directions on the pair of rails.

12. The mobile terminal of claim 10, wherein the second rail has a shape corresponding to the extended end of the first coupling hinge, and wherein the extended end partially overlaps or does not overlap the second rail when the mobile terminal is in the first state.

13. The mobile terminal of claim 1, wherein the first frame includes:

a first front portion coupled with the first region of the flexible display device; and a first rear portion spaced behind the first front portion, and wherein the second frame includes:

a second rear portion located on a rear surface of the first rear portion when the mobile terminal is in the first state; and a display support positioned on a rear surface of the first front portion when the mobile terminal is in the first state, and positioned on a rear surface of the third region of the display unit when the mobile terminal is in the second state.

* * * * *